(12) United States Patent
Siddle

(10) Patent No.: US 8,570,567 B2
(45) Date of Patent: Oct. 29, 2013

(54) INTELLIGENT NETWORK SPEED FOR OPTIMIZING ENERGY CONSUMPTION AT A PRINTING DEVICE THROUGH THE USE OF A VARIABLE NETWORK CONNECTION

(75) Inventor: Paul Alexander Siddle, St Albans (GB)

(73) Assignee: Xerox Corporation, Norwalk, CT (US)

( * ) Notice: Subject to any disclaimer, the term of this patent is extended or adjusted under 35 U.S.C. 154(b) by 467 days.

(21) Appl. No.: 12/884,961

(22) Filed: Sep. 17, 2010

(65) Prior Publication Data

US 2012/0069387 A1    Mar. 22, 2012

(51) Int. Cl.
| | |
|---|---|
| G06K 15/00 | (2006.01) |
| G06F 3/12 | (2006.01) |
| G06F 15/16 | (2006.01) |
| G01R 31/08 | (2006.01) |
| H04L 12/28 | (2006.01) |

(52) U.S. Cl.
USPC ......... 358/1.15; 358/1.14; 709/223; 709/236; 709/237; 370/232; 370/395.5; 370/395.52

(58) Field of Classification Search
USPC ............... 358/1.15, 1.14, 508, 530, 401, 476; 713/300, 322, 320, 1, 151, 153, 340, 713/600; 370/389, 395.53, 395.52, 232, 370/254, 351, 358, 359, 362, 398, 395.5, 370/419, 421, 460, 464, 466, 469, 536, 543, 370/901, 902, 908, 912; 709/232, 201, 203, 709/204, 217, 223, 227, 233, 236, 237, 249

See application file for complete search history.

(56) References Cited

U.S. PATENT DOCUMENTS

| | | | |
|---|---|---|---|
| 2006/0212730 A1* | 9/2006 | Senda | 713/300 |
| 2007/0240004 A1 | 10/2007 | Maeda | |
| 2008/0123641 A1* | 5/2008 | Park | 370/389 |
| 2009/0248890 A1 | 10/2009 | Shouno | |
| 2009/0285221 A1* | 11/2009 | Ito | 370/395.53 |

* cited by examiner

*Primary Examiner* — Ngon Nguyen
(74) *Attorney, Agent, or Firm* — Fox Rothschild LLP

(57) ABSTRACT

A method for conserving energy at a printing device. The method includes establishing, by a network adapter operably connected to a control system of the printing device, a low-speed network connection, thereby operably connecting the printing device to a data transfer network; receiving, at the printing device, an indication of at least one incoming print job; determining, by the control system, whether the at least one incoming print job requires a high-speed network connection; maintaining the low-speed network connection until the control system determines at least one incoming job requires a high-speed network connection; and, in response to the control system determining that at least one incoming print job requires a high-speed network connection, establishing, by the network adapter, a high-speed network connection.

11 Claims, 3 Drawing Sheets

INTELLIGENT NETWORK SPEED FOR OPTIMIZING ENERGY CONSUMPTION AT A PRINTING DEVICE THROUGH THE USE OF A VARIABLE NETWORK CONNECTION

BACKGROUND

The present disclosure relates to methods of using a printing device. More specifically, the present disclosure relates to methods of conserving energy used by a printing device through the use of a variable network connection.

Copiers, printers, scanners and multifunction printing devices are familiar in many office environments. (As used herein, all such machines will be generically called "printing devices.") A printing device may be connected to a high-speed network via a network adapter or interface in the printing device. The network adapter or interface is generally configured to continually operate at a high-speed such that any incoming documents to be printed are received quickly and further processed by the printing device. The speed of the network adapter or interface is generally determined based upon the potential speed of the data network the printing device is connected to. For example, if a printing device is connected to a Gigabit Ethernet (i.e., a network having a maximum data transfer rate of 1 gigabit per second), the network adapter or interface is generally configured to operate at one gigabit per second. By maintaining a high network speed (i.e., one gigabit per second), a large number of incoming documents or print jobs may be processed throughout a specific time period such as an eight-hour business day. However, the network adapter or interface requires a large amount of energy to maintain the high-speed connection.

It is generally known in the office equipment industry that printing devices may have active and inactive states. Typically, a printing device will be consuming more energy during an active state than an inactive state. Thus, to conserve energy a printing device may enter the inactive state after an idle period. However, regardless of what state the printing device is in, the network adapter or interface remains functioning at its previously established high-speed network connection.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one general respect, the embodiments disclose a method for conserving energy at a printing device. The method includes establishing, by a network adapter operably connected to a control system of the printing device, a low-speed network connection, thereby operably connecting the printing device to a data transfer network; receiving, at the printing device, an indication of at least one incoming print job; determining, by the control system, whether the at least one incoming print job requires a high-speed network connection; maintaining the low-speed network connection until the control system determines at least one incoming job requires a high-speed network connection; and, in response to the control system determining that at least one incoming print job requires a high-speed network connection, establishing, by the network adapter, a high-speed network connection.

In another general respect, the embodiments disclose a method for conserving energy at a printing device. The method includes initializing, by a control system integrated in a printing device, the printing device; establishing, by a network adapter operably connected to the control system, a low-speed network connection, thereby operably connecting the printing device to a data transfer network; receiving, at the printing device, an indication of at least one incoming print job; determining, by the control system, whether the at least one incoming print job requires a high-speed network connection; and maintaining the low-speed network connection until the control system determines at least one incoming job requires a high-speed network connection. In response to the control system determining at least one incoming print job requires a high-speed network connection, the method includes establishing, by the network adapter, a high-speed network connection, receiving the at least incoming print job via the high-speed network connection, processing the at least one incoming print job, determining if there are any additional incoming high-speed print jobs, and, in response to the control system determining that there are no additional incoming high-speed print jobs, re-establishing the low-speed network connection.

In another general respect, the embodiments disclose a method for conserving energy at a printing device. The method includes initializing, by a control system integrated in a printing device, the printing device; establishing, by a network adapter operably connected to the control system, a low-speed network connection, thereby operably connecting the printing device to a data transfer network; receiving, at the printing device, an indication of a plurality of incoming print jobs; determining, by the control system, whether at least one incoming print job of the plurality of incoming print jobs requires a high-speed network connection; maintaining the low-speed network connection until the control system determines at least one incoming job requires a high-speed network connection; in response to the control system determining that at least one incoming print job requires a high-speed network connection, establishing, by the network adapter, a high-speed network connection; receiving each of the plurality of incoming print jobs that requires a high-speed network connection via the high-speed network connection; processing each of the plurality of incoming print jobs that requires a high-speed network connection; and, after processing each of the plurality of incoming print jobs that requires a high-speed network connection, re-establishing the low-speed connection.

DETAILED DESCRIPTION

For purposes of the discussion below, the term "printer" or "printing device" refers to an electronic device that is capable of receiving commands, printing text characters and/or images on a substrate, and/or scanning images. Printing devices may include, but are not limited to, network printers, production printers, copiers and other devices using ink or toner, and scanners. A printing device may also perform a combination of functions such as printing/scanning, in which case such a device may be considered a multifunction printing device.

A "network adapter" refers to an integrated circuit or interface to connect a device to a network, such as a local area network or an Ethernet network. The network adapter may ping or otherwise send a connection request to a server or network administration device requesting connection information related to a data network. The server or network administration device may respond to the connection request with information related to the data network such as addressing information, communication protocols used, and other related connection information. Based upon the connection information, the network adapter establishes a connection to the data network. After the connection is established, the network adapter allows the device to communicate with additional devices connected to the network or other networks.

A "control system" refers to a one or more processors or processing devices that are integrated into a printing device and configured to control the operation of the printing device. The control system may include internal memory and other ancillary chips such as input/output controllers, counters, timers, and other similar computer circuit components. The control system may also be operably connected to a remote memory device used to store incoming data or instructions. The control system may receive a user request for a specific function of the printing device, process the request, and instruct other interconnected components of the printing device to operate in accordance with the user request.

Figure 1:
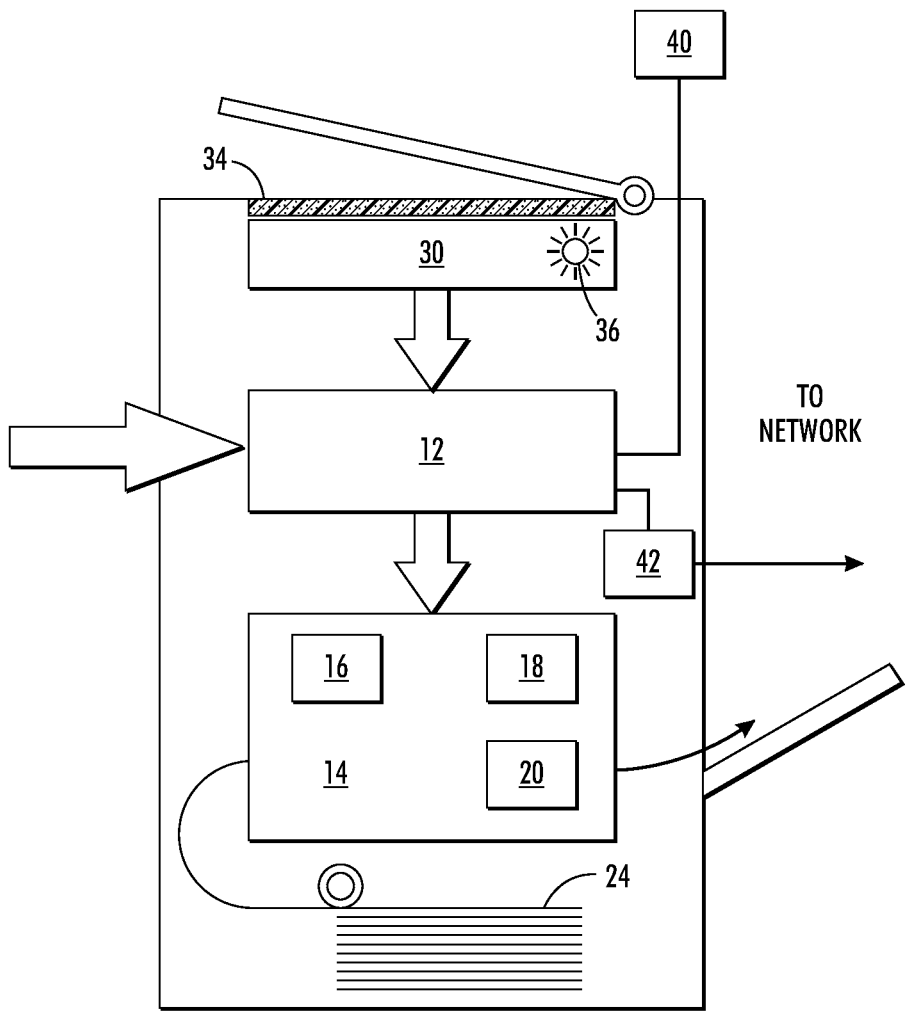
FIG. 1 illustrates an exemplary elevational view of a multifunction printing device according to an embodiment.

FIG. 1 illustrates an elevational view of an exemplary printing device 10. The printing device 10 may include a control system 12, which accepts image data from an external source, such as a local area network or Ethernet. The control system 12 may establish a connection to the network via a network adapter 42. The control system 12 may access storage means, such as an internal memory, for retaining image data, such as when multiple print jobs or other requests such as scanning or copying jobs are entered into the control system 12.

The control system 12 may be operably connected to a "print engine" 14. The print engine 14 may include various components related to processing an incoming print job and applying any images contained in the incoming print job onto a sheet. Most types of print engines include at least one motor, such as motor 16 for moving a sheet relative to the print engine. The motor 16 may register a sheet drawn from a stack such as stack 24, in a position to receive an image from the print engine 14. A xerographic print engine 14 may further include a charge device 18, such as a corona device, development unit, or transfer device, which is brought to a potential in order to operate. In an alternative embodiment, a print engine 14 may include a heating device 20, which is brought to a predetermined temperature to operate. Even in a typical xerographic printer, a heating device 20, such as a fuser, is typically employed.

The control system 12 may be further associated with a scanner 30 for recording image data from a hard-copy original, such as an original placed on a platen 34 or run through a document handler (not shown). In an embodiment, scanner 30 may include an illumination lamp 36, which must reach a certain brightness in order to operate. The image data recorded at scanner 30 may be retained within control system 12, for substantially instant printing through print engine 14, when the printing device 10 operates as a copier. The printing device 10 may include a user interface 40, such as a buttonpad or touchscreen, by which a human user may enter commands (e.g., how many copies to be printed, reduction/enlargement, stapling, email/fax a document, etc.).

As mentioned above, various hardware elements of the printing device 10, such as the motor 16, the charge device 18, the heating device 20, and/or the illumination device 36, may require an appreciable amount of time to change from an inactive mode to an active mode, in which the elements are ready for outputting prints. It is known in the art to operate a printing device in what is generally called a "sleep" or "energy-saving" mode, in which, for example, after a period of about 10 minutes without receiving a new job to be printed, the fuser, the corotrons and/or other charged members, are placed in the inactive state. When a print job is subsequently sent to the printing device, the fuser and charge devices "warm up," or return to an active state. It should be noted that while an electrophotographic or xerographic printing device has been discussed herein, the printing device may also include other printing technologies, such as various types of ink-jet printing.

The printing device 10 may establish and maintain a connection to a data network via the network adapter 42. To optimize performance of the printing device 10, the network adapter 42 may establish and maintain a high-speed network connection (e.g., a maximum transfer rate of about 1 gigabit per second). Depending on the maximum transfer rates of both the data network and the network adapter, the high-speed connection may be determined to be the lesser of the two maximum transfer rates. For example, if the network interface is capable of transferring data at 10 gigabits per second and the data network is only capable of transferring data at 1 gigabit per second, the high-speed network connection may be set at the lesser of the two maximum values, i.e., 1 gigabit per second.

The high-speed network connection may require a large amount of energy. When the printing device 10 is not receiving any data, this high-speed connection may be wasting energy. As such, the network adapter 42 may be configured such that when the printing device 10 and/or various components such as the fuser and charge devices as discussed above, enters a sleep or inactive mode, the network adapter reduces the speed of the network connection to a slow speed such as 1 megabit per second, 10 megabits per second, or another speed one or more orders of magnitude less than the high-speed. Similarly, depending on the configuration of the network adapter 42, the low-speed network connection may have a data transfer speed or bit rate that is no more than 25% of the transfer speed of the high-speed network connection. For example, in certain embodiments, the low-speed network connection may be 10% of the high-speed network connection. In yet another alternative, the low-speed network connection may be determined based upon an algorithm that determines which connection speed results in the lowest amount of energy consumed by the network adapter 42.

Once a level is set for the low-speed network connection, the low-speed network connection may be maintained until the printing device 10 transitions to active mode.

The network adapter 42 may be further configured to transition between a high-speed network connection and a low-speed network connection independent of the status of the printing device 10. For example, the printing device 10 may be in an active state making copies; however, this function may not require a high-speed network connection as there is little or no data being transferred from the printing device to the data network. As such, the network adapter 42 may establish or maintain a low-speed network connection while copying. Various processes for establishing a low or high-speed network connection are disclosed in the following discussions of FIGS. 2 and 3.

Figure 2:
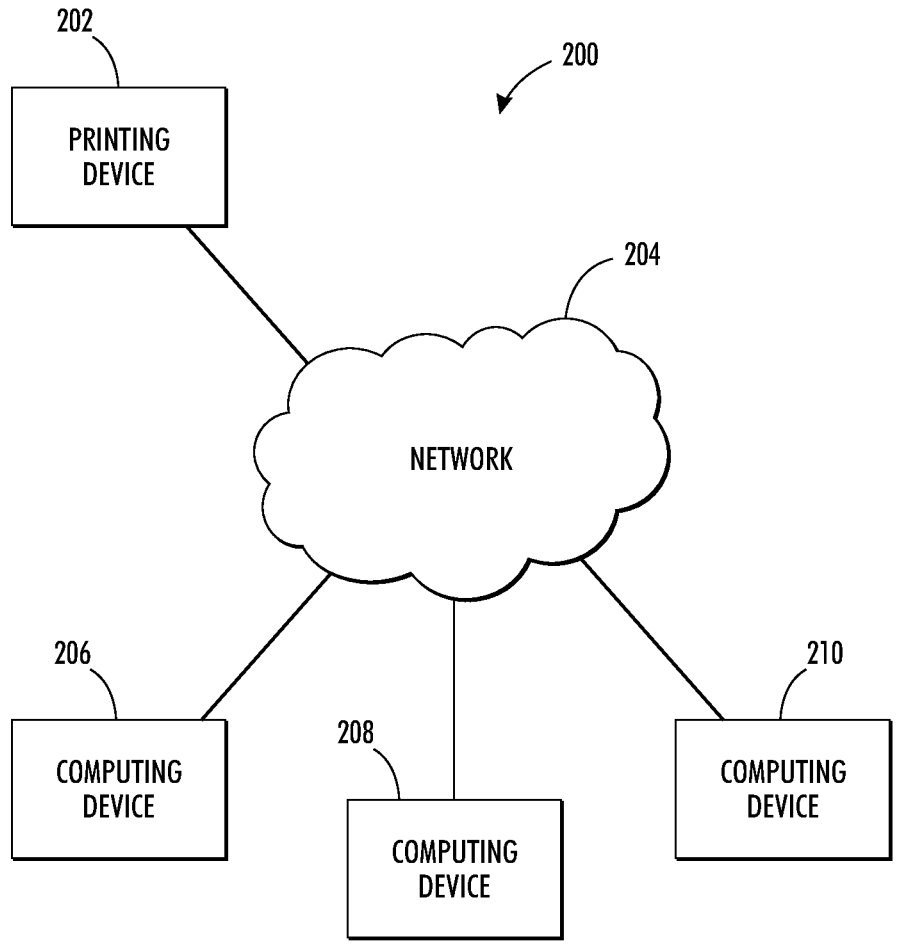
FIG. 2 illustrates an exemplary data transfer network according to an embodiment.

FIG. 2 illustrates an exemplary system 200. The system 200 may include at least one printing device 202 connected via a data network 204 to computing devices 206, 208 and 210. The data network may be a local area network such as an Ethernet network, a wide area network such as the Internet, or a combination of both local and wide area networks. Similar to printing device 10, the printing device 202 may be a multifunction printing device. The data network 204 may be a high-speed data transfer network such as a Gigabit Ethernet network. The computing devices 206, 208 and 210 may be desktop computers operably connected to the data network 204, laptop computers operably connected to the data network via a wired or wireless connection, a personal portable computing device such as a personal digital assistant, net book, or other similar device, or a combination of devices operably connected to the data network. It should be noted that the network architecture and associated devices as shown in FIG. 2 are shown by way of example only and may be altered accordingly depending on any characteristics and/or requirements of a specific system.

When initialized, the printing device 202 may establish a network connection to data network 204 via a network adapter, such as network adapter 42 as discussed above. Depending on various settings and parameters of both the printing device 202 and the data network 204, the network connection may be one of several speeds. For example, printing device 202 may be configured to establish a low-speed network connection upon initialization, maintaining the low-speed connection until the printing device receives a print job to perform. Alternatively, the printing device 202 may establish a high-speed network connection upon initialization and maintain the high-speed network connection until initialization is complete. Then, upon completion of the initialization process, the printing device 202 may establish a low-speed network connection, thereby conserving the energy required to maintain the high-speed connection.

The printing device 202 may maintain the low-speed network connection until an indication of a pending print job is received from one of the computing devices 206, 208 and 210. Prior to forwarding the print job to the printing device 202, the computing device 206, 208 or 210 may first send an indication and, after sending the indication, wait for a response from the printing device indicating the printing device is operating correctly and capable of processing the print job. The indication of the pending print job may include the type of job (e.g., print, fax) and the amount of data included in the print job. Depending on the indication, the printing device 202 may establish a high-speed network connection to the network 204 in order to receive the incoming print job. For example, the printing device 202 may receive an indication from computing device 206 of a document to be printed. The document may include a large amount of color images. Thus, the print job may be a large data file requiring a high-speed connection for efficient transfer between the computing device 206 and the printing device 202. As such, the printing device 202 may establish a high-speed connection to data network 204 to receive the print job from computing device 206. Once the print job is received, the printing device 202 may again establish a low-speed network connection until another indication of a print job is received.

Alternatively, the printing device 202 may receive an indication from computing device 208 of a document to be printed. The document may include several pages of text. Thus, the print job may be a small data file that may be efficiently transferred between the computing device 206 and the printing device 202 via a low-speed connection. As such, the printing device 202 may maintain the low-speed connection to data network 204 to receive the print job from computing device 206.

Depending on the various characteristics, the printing device 202 may be configured to operate at either a high-speed connection or a low-speed connection continually. For example, a company may be concerned with the total amount of energy it consumes. As such, the company, or a related person such as a contracted technology supervisor or manager, may configure the printing device 202 to operate only at a low-speed network connection. Any time lost in efficiency transferring print jobs to the printing device 202 may be acceptable to the company based upon the potential energy savings resulting from maintaining the low-speed connection.

Similarly, a user or system administrator may set time constraints on the speed of the network connection. Outside of normal business hours, for example between 7 P.M. and 7 A.M., the cost of electricity may be reduced and the cost of energy consumed by the printing device 202 when a high-speed connection is used may be negligible. Thus, during this time period, the printing device 202 may be configured to operate a high-speed network connection when a print job is received. During normal business hours (e.g., between 7 A.M. and 7 P.M.) the cost of energy may rise and, based upon the increased costs, the printing device 202 may be configured to maintain a low-speed network connection during this time period regardless of the type of incoming print job.

Alternatively, a user or system administrator may set a filtered scheme for determining the speed of the printing device's connection to a data network. In one example, the filtered scheme may be based upon a user's position or rank within a company or business hierarchy. Any job submitted by a user with a high rank or position within the company, such as manager, owner, president, etc., may submit print jobs to be received and processed via a high-speed network connection while other employees may submit print jobs received and processed via a low-speed network connection. Similarly, a software printer driver associated with the printing device may include an option such as "Print Over Low-speed Connection" to a user such that the user may opt to submit a print job over a low-speed connection if, for example, the print job has a low priority to the user.

It should be noted that the above scenarios are shown by way of example only and may be modified and/or altered accordingly depending on various aspects such as business operating parameters, network architecture, and other such aspects that may affect the impact of energy consumption.

Figure 3:
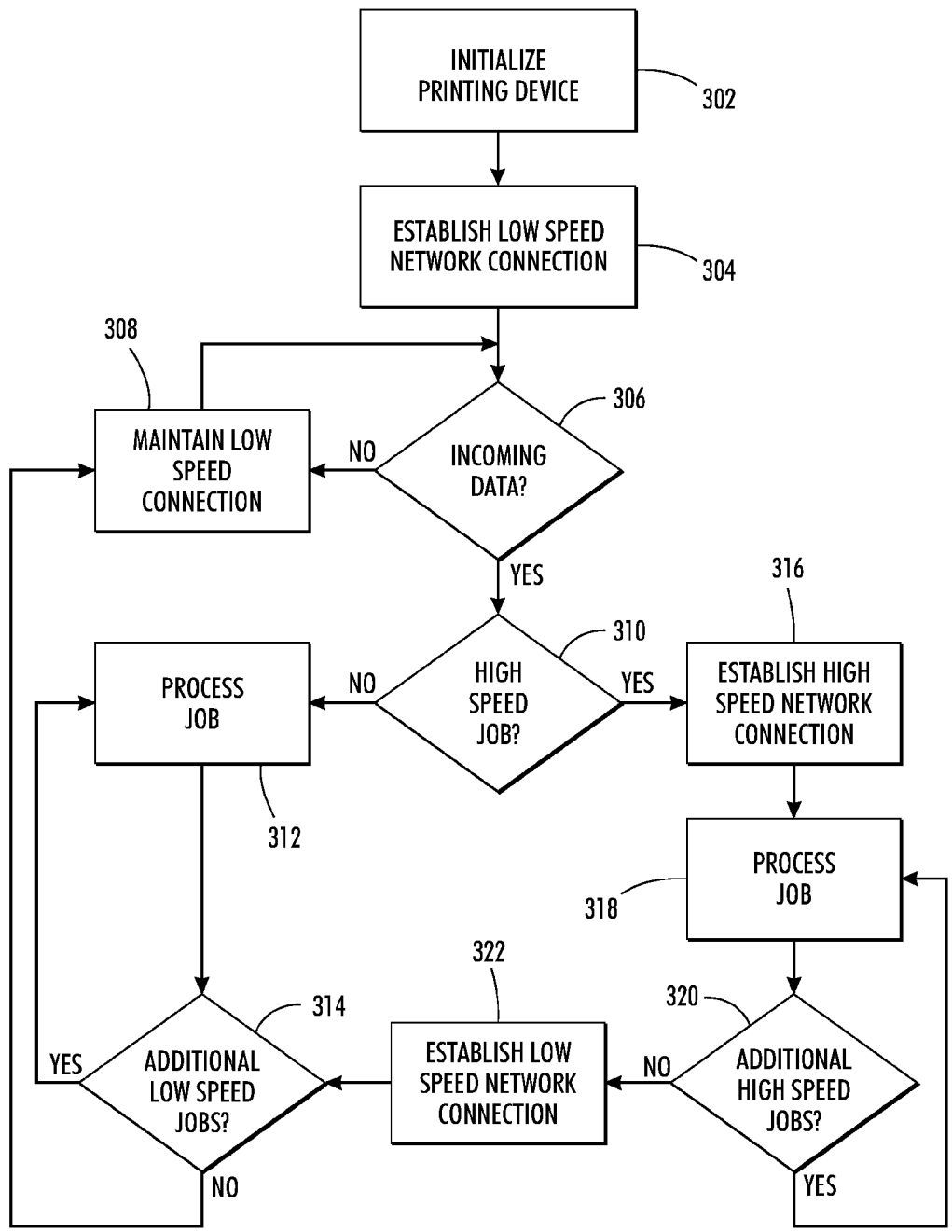
FIG. 3 is a flowchart illustrating exemplary steps of a method of optimizing energy consumption at a printing device according to an embodiment.

FIG. 3 illustrates an exemplary process for optimizing energy consumption at a printing device, such as printing devices 10 and 202 as discussed above. As discussed above, the printing device may be initialized 302. During initialization 302, the printing device may perform a standard start-up routine that includes testing and aligning print heads or warming up a toner fuser, determining paper and toner/ink levels, and/or any other warm-up functions. The printing device may also establish a network connection to a shared data network, such as data network 204, such that other network devices operably connected to the data network may access and utilize the printing device. Depending on the data network architecture, a print server or other similar device may monitor and manage network traffic to and from the printing device. After initialization 302, the printing device may establish 304 a low-speed network connection to the data network. Depending on the data network's capabilities and parameters, a low-speed connection may have a maximum data transfer rate of about 1 megabit per second. Depending on the programming and configuration of the printing device, the printing device may establish 304 the low-speed network connection during initialization 302 or after initialization is complete.

Once connected to the data network, the printing device may monitor any incoming data to determine 306 if the incoming data contains an indication of at least one upcoming print job. If the printing device determines 306 there is no indication of at least one upcoming print job, the printing device may maintain 308 the low-speed network connection. However, if the printing device does determine 306 there is an indication of at least one upcoming print job, the printing device may determine 310 whether the upcoming print job is a high-speed print job. As discussed above, a high-speed print job may include a large amount of data that is more efficiently transferred via a high-speed network connection. If the printing device determines 310 that the upcoming print job is not a high-speed print job, the printing device may receive the print job, process 312 the print job, and determine 314 if there are any additional low-speed print jobs. If there are additional low-speed print jobs, the printing device may process 312 the additional low-speed print jobs. If there are no additional low-speed print jobs, the printing device may maintain 308 the low-speed network connection and determine 306 if there is indication of at least one upcoming print job.

If the printing device determines 310 that the upcoming print job is a high-speed print job, the printing device may establish 316 a high-speed network connection to the data network. The printing device may process 318 the high-speed job and determine 320 if there are any additional high-speed print jobs. If it is determined 320 there are additional high-speed print jobs, those print jobs may also be processed 318. If there are no additional high-speed print jobs, the printing device may establish 322 a low-speed network connection to the data network.

As before, the printing device may determine 314 if there are any additional low-speed print jobs. As before, if there are additional low-speed print jobs, the printing device may process 312 the additional low-speed print jobs. If there are no additional low-speed print jobs, the printing device may maintain 308 the low-speed network connection to the data network and continue to determine 306 if there is indication of at least one upcoming print job.

The process as illustrated in FIG. 3 may be repeated until the printing device is turned off, disabled, or otherwise removed from the data network. It should be noted that the process as illustrated in FIG. 3 is shown by way of example only and may be modified accordingly depending on various aspects such as business operating parameters, network architecture, and other such aspects that may affect the impact of energy consumption.

It should be noted that the process as discussed above may be expanded to incorporate additional components beyond the printing device as discussed herein. For example, as shown in FIG. 2, data network 204 may include one or more additional components such as network hubs, print servers, network switches, routers, and other network hardware components operably connected to the printing device 202. These additional components may be configured to operate in concert with the printing device 202 such that when the printing device establishes and maintains a low-speed network connection, the additional components also establish and maintain a low-speed network connection, thus conserving energy at the additional components as well. For example, when the printing device 202 establishes a low-speed connection, a router operably connected to the printing device and configured to direct data network traffic to the printing device may also establish a low-speed connection such that energy is not wasted at the router. When the printing device 202 receives an indication of an upcoming high-speed print job, the printing device and the router may establish high-speed connections for transferring the high-speed print job.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for conserving energy at a printing device comprising:
    establishing, by a network adapter operably connected to a control system of the printing device, a low-speed network connection, thereby operably connecting the printing device to a data transfer network;
    receiving, at the printing device, an indication of at least one incoming print job;
    determining, by the control system, whether the at least one incoming print job requires a high-speed network connection;
    in response to the control system determining that at least one incoming print job does not require a high-speed network connection:
        maintaining the low-speed network connection until the control system determines at least one incoming job requires a high-speed network connection,
        and processing the at least one incoming job at the low-speed connection; and
    in response to the control system determining that at least one incoming print job requires a high-speed network connection, establishing, by the network adapter, a high-speed network connection.

2. The method of claim 1, further comprising receiving, via the high-speed network connection, the at least one incoming print job.

3. The method of claim 2, further comprising processing the at least one incoming print job.

4. The method of claim 3, further comprising re-establishing the low-speed network connection after the at least one incoming print job is processed.

5. The method of claim 1, wherein the low-speed connection comprises a network connection configured to operate at a maximum data transfer rate of about one megabit per second.

6. The method of claim 1, wherein the high-speed network connection comprises a network connection configured to operate at a maximum data transfer rate of about one gigabit per second.

7. The method of claim 1, further comprising reducing, at least one additional component operably connected to the printing device, a network connection to a low-speed network connection when the printing device is maintaining the low-speed network connection such that energy is conserved at the at least one additional component, wherein the at least one additional component comprises a network switch, a router, a network hub or a print server.

8. A method for conserving energy at a printing device comprising:
    initializing, by a control system integrated in a printing device, the printing device;

establishing, by a network adapter operably connected to the control system, a low-speed network connection, thereby operably connecting the printing device to a data transfer network;

receiving, at the printing device, an indication of at least one incoming print job;

determining, by the control system, whether the at least one incoming print job requires a high-speed network connection;

in response to the control system determining that at least one incoming print job does not require a high-speed network connection:

maintaining the low-speed network connection until the control system determines at least one incoming job requires a high-speed network connection, and processing the at least one incoming job at the low-speed connection; and in response to the control system determining at least one incoming print job requires a high-speed network connection:

establishing, by the network adapter, a high-speed network connection, receiving the at least incoming print job via the high-speed network connection, processing the at least one incoming print job, determining if there are any additional incoming high-speed print jobs, and in response to the control system determining that there are no additional incoming high-speed print jobs, re-establishing the low-speed network connection.

9. The method of claim 8, wherein:

the low-speed connection comprises a network connection configured to operate at a maximum data transfer rate of about one megabit per second; and the high-speed network connection comprises a network connection configured to operate at a maximum data transfer rate of about one gigabit per second.

10. A method for conserving energy at a printing device comprising:

initializing, by a control system integrated in a printing device, the printing device;

establishing, by a network adapter operably connected to the control system, a low-speed network connection, thereby operably connecting the printing device to a data transfer network;

receiving, at the printing device, an indication of a plurality of incoming print jobs;

determining, by the control system, whether at least one incoming print job of the plurality of incoming print jobs requires a high-speed network connection;

in response to the control system determining that the plurality of incoming print job do not require a high-speed network connection:

maintaining the low-speed network connection until the control system determines at least one incoming job requires a high-speed network connection, and processing the plurality of incoming print jobs;

in response to the control system determining that at least one incoming print job requires a high-speed network connection, establishing, by the network adapter, a high-speed network connection;

receiving each of the plurality of incoming print jobs that requires a high-speed network connection via the high-speed network connection;

processing each of the plurality of incoming print jobs that requires a high-speed network connection; and after processing each of the plurality of incoming print jobs that requires a high-speed network connection, re-establishing the low-speed connection.

11. The method of claim 10, wherein:

the low-speed connection comprises a network connection configured to operate at a maximum data transfer rate of about one megabit per second; and the high-speed network connection comprises a network connection configured to operate at a maximum data transfer rate of about one gigabit per second.

* * * * *